Sept. 8, 1942.   H. G. JENKINS ET AL   2,295,040
COMBINATION OF SOURCES OF RADIATION WITH LUMINESCENT MATERIALS
Filed May 6, 1940
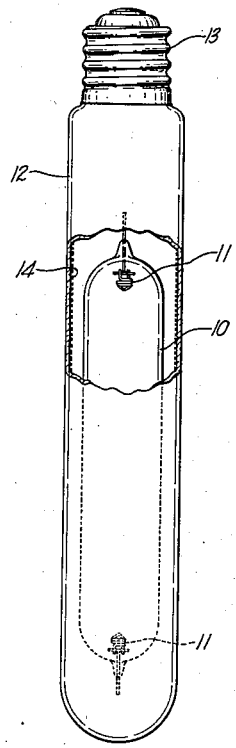
Inventor:
Henry G. Jenkins,
John W. Ryde,
by John H. Anderson
Their Attorney.

Patented Sept. 8, 1942

2,295,040

UNITED STATES PATENT OFFICE 2,295,040

COMBINATION OF SOURCES OF RADIATION WITH LUMINESCENT MATERIALS

Henry Grainger Jenkins, Pinner, and John Walter Ryde, London, England, assignors to General Electric Company, a corporation of New York Application May 6, 1940, Serial No. 333,684
In Great Britain May 16, 1939

5 Claims. (Cl. 176—122)

This invention relates to combinations comprising (1) an electric discharge device adapted in operation to produce radiation, and (2) material adapted to be excited to luminescence by the said radiation and exposed to it.

It has been proposed to use luminescent cadmium tungstate in mercury vapor lamps, and it has been said that the luminescent light that it emits under excitation by the mercury spectrum (mainly by the line at 2537 A. U.) is pale blue and not very different in color from that emitted by magnesium tungstate. It has been said also that it is not necessary to this luminescence that any activator should be intentionally introduced; and, though the presence of an "activator," such as lead, is not excluded, no suggestion has been made that the excitation function or the color of the luminescent light could be altered by its presence. It has now been found that cadmium tungstate can be activated by activators so that it emits under suitable excitation light much less blue (i. e. greener or yellower or redder) than the light from magnesium tungstate or from unactivated cadmium tungstate, and that, when the excitation is by the mercury spectrum, it is mainly due to the line at 3650 A. U. and not to the line at 2537 A. U. This activated cadmium tungstate differs from the cadmium tungstate with which the said application is concerned both in the excitation and in the resulting luminescence; it is an essentially different luminescent material. The most suitable activators found at present are uranium and bismuth.

According to the invention in a combination comprising (1) an electric discharge device adapted in operation to produce radiation and (2) material adapted to be excited to luminescence by the said radiation and exposed to it some or all of the said material (2) is cadmium tungstate so activated by means of an activator that it is excited to luminescence by radiation of wave-length 3650 A. U., and the dominant wavelength of the luminescent light so excited is considerably longer than that emitted by known luminescent magnesium tungstate when excited by radiation of wave-length 2537 A. U.

We desire it to be understood that, in calling a substance an activator hereinbefore and hereinafter, we imply that (a) it belongs to a class of substances such that the presence of at least one of them is essential to the luminescence under discussion, (b) the amount of it that must be present in order that this luminescence should be obtained is not more than a few per cent of the whole material, (c) that its presence in this amount makes little or no difference to the crystal lattice as determined by X-ray analysis; and that we imply no more. It is to be observed that an activator must always be related to a particular luminescence. Thus, uranium is an activator in respect of the said luminescence excited mainly by radiation of wave-length 3650 A. U., but is not an activator in respect of the said luminescence excited mainly by radiation of 2537 A. U.; for the presence of uranium (or of some alternative) is essential to the occurrence of the former, but not to that of the latter.

In use, the said activated cadmium tungstate resembles the luminescent sulphides rather than the well-known calcium or magnesium tungstates. For, when it is excited by a discharge through mercury vapor, it is excited mainly, though not exclusively, by radiation to which ordinary glass is transparent, and not, like those tungstates, mainly by the line at 2537 A. U. It may therefore be placed outside a glass envelope. It need not then be mechanically integral with the discharge device; thus it may be placed on a reflector surrounding the device or on the dial of an instrument irradiated by the device. On the other hand, the two elements of the combination must, of course, form a single article in respect of making, vending, or using. On the other hand, unlike the sulphides, the said activated cadmium tungstate is not excited well by electrons of some 3000 electron-volts energy. It is not therefore suitable for the fluorescent screens of cathode-ray tubes.

The said activated cadmium tungstate may, like other luminescent materials, be mixed with other materials, luminescent or non-luminescent; and (in accordance with conventional terminology) it is not to be deemed to cease to be the said activated cadmium tungstate merely because it is so mixed. This is implied by the words "some or all" in the foregoing statement of the invention.

The activators may be introduced by several of the methods usual in the art. One method will now be described by way of example.

198 gm. of sodium tungstate of high grade is dissolved in 1 litre of distilled water to form solution A.

154 gm. of cadmium sulphate of high grade is dissolved in 1 litre of distilled water to form solution B.

10 ml. of solution A is added to solution B; and the precipitate formed is filtered off and discarded. The remainder of solution A is added to the filtrate; the precipitate is filtered off, washed six times with hot distilled water and dried at 180° C.

0.1% by weight of uranium is added in the form of the nitrate; the mixture is dried at 180° C. The solid is ground and heated at 1000° C. in a silica boat for one hour in air. It is reground lightly, washed six times with boiling distilled water, dried at 180° C. and sieved to give a suitable particle size. The luminescent light excited by radiation of wave-length 3650 A. U. is red.

0.5% of bismuth, introduced as chloride, may replace the 0.1% of uranium. But we have found that a proportion of bismuth considerably in excess of that mentioned produces slightly increased luminescence; thus, the proportion of bismuth is preferably about 2-3%. The luminescent light under the same excitation is yellow. Two or more of the said activators may be used together.

The drawing is an elevation, partly in section, of one form of lamp in which the luminescent material may be incorporated in accordance with this invention.

Referring to the drawing, the lamp shown therein comprises an envelope 10 having electrodes 11—11 sealed in the ends thereof and containing a gaseous atmosphere comprising mercury vapor which, during operation, emits radiation of 3650 A. C. wave length. The lamp 10 is enclosed in an outer envelope or jacket 12 which has a base 13 attached to an end thereof. The luminescent cadmium tungstate is here shown in the form of a coating 14 on the inner surface of the jacket 12 where it is exposed to the radiation emitted by the lamp 10.

We claim:

1. An electric discharge device the discharge of which produces radiation of 3650 A. U. wave length in combination with finely divided cadmium tungstate so activated that when it is excited to luminescence by exposure to radiation of wave length 3650 A. U. the dominant wave-length of the luminescent light is considerably longer than that emitted by known luminescent magnesium tungstate when excited by radiation of wave-length 2537 A. U.

2. An electric discharge device the discharge of which produces radiation of 3650 A. U. wave length in combination with a body on which is finely divided cadmium tungstate so activated that when it is excited to luminescence by exposure to radiation of wave length 3650 A. U. the dominant wave-length of the luminescent light is considerably longer than that emitted by known luminescent magnesium tungstate when excited by radiation of wave-length 2537 A. U.

3. An electric discharge device the discharge of which produces radiations of 3650 A. U. wave length in combination with a body on which is finely divided cadmium tungstate so activated by means of uranium that when it is excited to luminescence by exposure to radiation of wave length 3650 A. U. the dominant wave-length of the luminescent light is considerably longer than that emitted by known luminescent magnesium tungstate when excited by radiation of wave-length 2537 A. U.

4. An electric discharge device the discharge of which produces radiations of 3650 A. U. wave length in combination with a body on which is finely divided cadmium tungstate so activated by means of bismuth that when it is excited to luminescence by exposure to radiation of wave length 3650 A. U. the dominant wave-length of the luminescent light is considerably longer than that emitted by known luminescent magnesium tungstate when excited by radiation of wave-length 2537 A. U.

5. An electric discharge device the discharge of which produces radiations of 3650 A. U. wave length in combination with a body on which is finely divided cadmium tungstate so activated by means of a mixture of uranium and bismuth that when it is excited to luminescence by exposure to radiation of wave length 3650 A. U. the dominant wave-length of the luminescent light is considerably longer than that emitted by known luminescent magnesium tungstate when excited by radiation of wave-length 2537 A. U.

HENRY GRAINGER JENKINS.
JOHN WALTER RYDE.